US011514648B2

(12) United States Patent
Sawhney et al.

(10) Patent No.: US 11,514,648 B2
(45) Date of Patent: Nov. 29, 2022

(54) ALIGNING INPUT IMAGE DATA WITH MODEL INPUT DATA TO GENERATE IMAGE ANNOTATIONS

(71) Applicant: MICROSOFT TECHNOLOGY LICENSING, LLC, Redmond, WA (US)

(72) Inventors: Harpreet Singh Sawhney, Kirkland, WA (US); Ning Xu, Seattle, WA (US); Amol Ashok Ambardekar, Redmond, WA (US); Moses Obadeji Olafenwa, Lagos (NG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/133,493

(22) Filed: Dec. 23, 2020

(65) Prior Publication Data

US 2022/0198753 A1 Jun. 23, 2022

(51) Int. Cl.
*G06T 19/00* (2011.01)
*G06T 7/70* (2017.01)
(Continued)

(52) U.S. Cl.
CPC .......... *G06T 19/00* (2013.01); *G06N 3/0454* (2013.01); *G06N 3/08* (2013.01); *G06T 7/70* (2017.01);
(Continued)

(58) Field of Classification Search
None
See application file for complete search history.

(56) References Cited

U.S. PATENT DOCUMENTS 10,417,781 B1 9/2019 Konolige et al.
2019/0251352 A1\* 8/2019 Hovden ............... G06K 9/6284
(Continued)

OTHER PUBLICATIONS

"Capture and transfer anything around you", Retrieved from: https://web.archive.org/web/20201102075425/https://clipdrop.co/, Nov. 2, 2020, 6 Pages.
(Continued)

*Primary Examiner* — Jeffrey J Chow
(74) *Attorney, Agent, or Firm* — Newport IP, LLC; Jacob P. Rohwer

(57) ABSTRACT

An image data annotation system automatically annotates a physical object within individual images frames of an image sequence with relevant object annotations based on a three-dimensional (3D) model of the physical object. Annotating the individual image frames with object annotations includes updating individual image frames within image input data to generate annotated image data that is suitable for reliably training a DNN object detection architecture. Exemplary object annotations that the image data annotation system can automatically apply to individual image frames include, inter alia, object pose, image pose, object masks, 3D bounding boxes composited over the physical object, 2D bounding boxes composited over the physical object, and/or depth map information. Annotating the individual image frames may be accomplished by aligning the 3D model of the physical object with a multi-view reconstruction of the physical object that is generated by inputting an image sequence into a Structure-from-Motion and/or Multi-view Stereo pipeline.

20 Claims, 9 Drawing Sheets

(51) Int. Cl.
  *G06N 3/04* (2006.01)
  *G06N 3/08* (2006.01)
  *G06T 17/00* (2006.01)
(52) U.S. Cl.
  CPC .... *G06T 17/00* (2013.01); *G06T 2207/10028* (2013.01); *G06T 2207/20081* (2013.01); *G06T 2207/20084* (2013.01); *G06T 2207/30241* (2013.01); *G06T 2210/12* (2013.01); *G06T 2210/56* (2013.01); *G06T 2219/004* (2013.01); *G06T 2219/2004* (2013.01)

(56) References Cited

U.S. PATENT DOCUMENTS

| | | | |
|---|---|---|---|
| 2020/0160601 A1* | 5/2020 | Shreve | G06F 30/00 |
| 2020/0211205 A1* | 7/2020 | LeGaye | G01B 11/2504 |
| 2021/0042992 A1* | 2/2021 | Newman | G02B 27/0172 |
| 2021/0049784 A1* | 2/2021 | Török | G06T 7/70 |
| 2021/0366075 A1* | 11/2021 | Chtcherbatchenko | G06T 5/50 |

OTHER PUBLICATIONS

Maninis, et al., "Vid2CAD: CAD Model Alignment using Multi-View Constraints from Videos", In Repository of arXiv:2012.04641v1, Dec. 8, 2020, 10 Pages.

"International Search Report and Written Opinion Issued in PCT Application No. PCT/US21/060413", dated Mar. 15, 2022, 14 Pages.

\* cited by examiner

○ = Point along 1st pose trajectory
✕ = Point along 2nd pose trajectory

○ = Point along 1st pose trajectory
✕ = Point along 2nd pose trajectory

ALIGNING INPUT IMAGE DATA WITH MODEL INPUT DATA TO GENERATE IMAGE ANNOTATIONS

BACKGROUND

The present disclosure relates to the field of computerized object detection and, more particularly, concerns automated image annotation techniques for improving both the quality and volume of reliable training data sets for use in object detection architectures.

Practical use case scenarios require autonomous and mixed reality systems to implement object detection techniques under diverse environmental conditions. For example, autonomous vehicles and mixed reality headsets have been proven to reliably perform three-dimensional (3D) Simultaneous Localization and Mapping (SLAM) techniques under vastly diverse lighting and imaging conditions environments. Deep Neural Networks (DNN) have emerged as a promising and viable technology for performing computerized object detection techniques such as 3D SLAM. However, numerous challenges exist with respect to enabling DDNs to reliably perform computerized object detection under diverse and often dynamic environmental conditions.

One major such challenge relates to the paucity of training data that is suitable for input to DNNs and other Artificial Intelligence (AI) object detection architectures. For example, effectively training a DNN model may require tens of thousands or even millions of image frames that are each individually annotated to indicate the location and/or orientation of the real-world object that is to be recognized, a daunting process which may require hundreds of hours of manual effort before the training of the DNN can even begin. This challenge is exacerbated by changing lighting conditions and the various viewpoints at which images of the real-world objects can be obtained—each of which makes training data generation very difficult. Due to these complexities the task of generating such training data remains an onerous and highly manual task that typically requires involvement from experts in AI or DNN object detection. Thus, despite the availability of resources that are specifically designed to enable users to build customized DNNs to suit specific object detection needs, since the onus of training data generation remains on the user these resources are unfortunately unworkable except by DNN experts.

It is with respect to these and other considerations that the disclosure made herein is presented.

SUMMARY

The techniques disclosed herein enable an image data annotation system to automatically annotate a physical object within individual images frames of an image sequence with relevant object annotations based on a three-dimensional (3D) model of the physical object. In various implementations, annotating the individual image frames with object annotations includes updating each individual image frame within image input data (e.g., a sequence of discrete still images and/or a video file) to generate annotated image data that is suitable for reliably training a DNN object detection architecture. Exemplary object annotations that the image data annotation system can automatically apply to individual image frames include, inter alia, object pose, image pose, object masks, 3D bounding boxes composited over the physical object, 2D bounding boxes composited over the physical object, and/or depth map information. Additionally, or alternatively, object annotations may include model specific annotations such as, for example, location of an annotated object, names of an annotated object, dimensions of one or more features of an annotated object, and an intended or suitable usage for an annotated object. In various implementations, annotating the individual image frames is accomplished by aligning the 3D model of the physical object with a multi-view reconstruction (e.g., a dense 3D point cloud) of the physical object that is generated by inputting an image sequence into a Structure-from-Motion (SFM) and/or Multi-view Stereo (MVS) pipeline. Once the 3D model is aligned with the multi-view reconstruction in association with each individual image frame of the image sequence, information may be extracted from the 3D model and applied as object annotations to each individual image frame of the image sequence.

Thus, the techniques described herein mitigate existing challenges as described above with respect to enabling DDNs (or other AI models) to reliably perform computerized object detection under diverse and dynamic environmental conditions. In particular, by receiving an input of a large image sequence and generating an output of annotated image data in which each individual image frame includes objects annotations that are suitable for training DNNs to perform object detection, the disclosed image data annotation system obviates the challenges of manual training data generation described above. That is, the image data annotation system automatically generates training data that would otherwise require daunting amounts of manual effort by human users. Furthermore, the automatically generated training data (e.g., the annotated image data) that is output by the image data annotation system is generated in a fraction of the time that manual annotation requires and with a higher degree of accuracy than typically yielded via manual annotation—even when performed by highly trained DNN experts. Accordingly, the disclosed techniques represent a marked improvement to the technical fields of object detection and three-dimensional (3D) Simultaneous Localization and Mapping (SLAM).

An object of the presently disclosed techniques is to receive and reliably annotate image input data that is captured under any different lighting conditions which may vary across times of day, year, and/or seasons. This is accomplished due to the techniques described herein functioning reliably even when there is no direct correlations or correspondence across the different videos captured and provided within the image input data. As such correlations and correspondence would typically be required by conventional SLAM and SFM and MVS techniques, the techniques disclosed herein represent a marked advance in these technological fields. For example, traditional SLAM, localization, SFM and MVS type 3D computer vision methods are fragile since they are largely unable to reliably find correspondences across imagery and videos that are captured under highly diverse illumination and viewpoint conditions. In SLAM and SFM-MVS this is still very much a research and unsolved problem. In contrast, the techniques disclosed herein bypass the cross-video correspondence problem by doing multi-view reconstruction within any given video of a diverse set of videos taken in drastically different lighting conditions.

In an exemplary implementation, the image data annotation system receives input data from a customer system. The input data may include image input data that includes a sequence of images taken of a physical object under various environmental conditions. For example, the input data may comprise a video of the physical object that is taken from multiple viewpoints (e.g., a user may move around a room while continuously filming the physical object and/or physical environment with a smart phone). The sequence of images may potentially be taken under various lighting conditions. For example, the user may take a first video of the physical object under daylight conditions while all lights in the room are turned off and may further take a second video of the physical object under different lighting conditions such as while some or all of the lights are turned on and/or during night time when natural lighting within the room is significantly different from when the first video was taken. In this way, appropriately annotating the individual frames of the image input data according to the techniques described below may yield training data that is suitable for enabling a DNN object detection architecture to "learn" how to reliably recognize the physical object under diverse and even changing environmental conditions.

The input data may further include model input data that defines a three-dimensional (3D) model of the physical object. For example, the input data may include a parametric model that defines both dimensions and shapes for geometric features of the physical object. Exemplary parametric models may be readily generated by use of conventional computer-aided design (CAD) software programs. In some implementations, the 3D model defined by the model input data may be an untextured 3D model. That is, the 3D model may fully define various geometric features of the physical object but may lack texture information that defines certain appearance characteristics of the physical object such as the application of varying colors or image files to different regions of the physical model. It will be appreciated that a textured 3D model may typically include a closed cell mesh defined at the outer surfaces of the 3D model and specific colors and/or image files applied to individual cells of the closed cell mesh.

The image data annotation system may generate a multi-view reconstruction of the physical object based on the image input data. For example, the image data annotation system may provide the sequence of images to a Structure-from-Motion (SfM) and/or a Multi-View Stereo (MVS) pipeline to cause generation of the multi-view reconstruction at an arbitrary scale. To account for the initially arbitrary (and therefore unknown) scaled multi-view reconstruction that is output from the SfM and/or MVS pipeline, image frame pose trajectory data that defines individual image poses for the individual image frames may be used to calculate a true scale for the physical object pictured in the sequence of images. For example, the sequence of images may be captured from an imaging application operating on a client device that is equipped with sensors (e.g., a gyroscope, an accelerometer, etc.) that enable the client device to generate 6 Degree-of-Freedom (6DoF) Euclidean poses for each individual image frame within the sequence of images. Each 6DoF Euclidean pose may be measured from a common coordinate system that is arbitrarily selected by the imaging application. Since this image frame pose trajectory data is captured by the client device concurrently with the sequence of images being captured, true scale information associated with the physical object imaged in the real-world (i.e., in the image input data) can be extracted therefrom. As described in more detail below, in some implementations the scale for the multi-view reconstruction may be determined by aligning the image from pose trajectory data generated at the client device concurrently with the sequence of images being captured with another pose trajectory that is generated by the SfM and/or MVS pipeline while building the multi-view reconstruction. Additionally, or alternatively, the scale for the multi-view reconstruction may be obtained via other means such as, for example, QR codes, markers, known dimensions for the object itself, and/or known dimensions for the physical environment in which the object resides during the imaging process.

The image data annotation system may then generate instances of alignment data that define individual alignments of the 3D model to each discrete orientation of the multi-view reconstruction that individually correspond to each individual frame. In this way, the 3D model may be reliably and accurately projected onto each individual frame of the entire sequence of images. Based on each instance of alignment data, the image data annotation system generates instances of annotated image data that include object annotations that are suitable for use as training data to "train" a DNN to recognize the physical object (that is represented in both the 3D model and pictured in the image input data) under diverse and even changing environmental conditions. For example, based on the alignment of the 3D model onto each individual image frame, the image data annotation system may annotate each individual image frame to include object annotations such as an object pose, an image pose, an object, mask, a 3D bounding box around the physical object, a 2D bounding box around the physical object, and/or a depth map corresponding to the physical object. Due to this training data being generated automatically by the image data annotation system rather than via the laborious manual annotation by a human user that is conventionally required, the techniques described herein represent a marked advance toward mitigating a predominant challenge with reliably implementing AI and DNN object detection architectures under diverse environmental conditions—i.e., the challenge of procuring vast quantities of suitable training data that is accurately annotated in association with diverse "training" environmental conditions.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses an image data annotation system that is configured to automatically annotate a physical object in each image frame of an image sequence based on a three-dimensional (3D) model of the physical object. Annotating the individual image frames may include updating each individual image frame of a video file to generate annotated image data that is suitable for reliably training a DNN object detection architecture. Exemplary object annotations that the image data annotation system can automatically apply to individual image frames include, inter alia, object pose, image pose, object masks, 3D bounding boxes composited over the physical object (e.g., bounding volumes), 2D bounding boxes composited over the physical object (e.g., bounding areas), and/or depth map information. Annotating the individual image frames may be accomplished by aligning the 3D model of the physical object with a multi-view reconstruction (e.g., a dense 3D point cloud) of the physical object that is generated by inputting the image sequence into a Structure-from-Motion (SFM) and/or Multi-view Stereo (MVS) pipeline. Once the 3D model is aligned with the multi-view reconstruction in association with each individual image frame, information may be extracted from the 3D model and applied as object annotations to each individual image frame of the image sequence.

The techniques described herein significantly mitigate existing challenges as described above with respect to enabling DNNs (or other AI models) to reliably perform computerized object detection under diverse and dynamic environmental conditions. In particular, by receiving an input of a large image sequence and generating an output of annotated image data in which each individual image frame includes objects annotations that are suitable for training DNNs to perform object detection, the disclosed image data annotation system automatically generates training data that would otherwise require daunting amounts of manual effort by human users. Furthermore, the automatically generated training data (e.g., the annotated image data) that is output by the image data annotation system is generated in a fraction of the time that manual annotation requires and with a higher degree of accuracy than typically yielded via manual annotation—even when performed by highly trained DNN experts.

Various examples, scenarios, and aspects of the disclosed techniques are described below with reference to FIGS. 1-8.

Figure 1A:
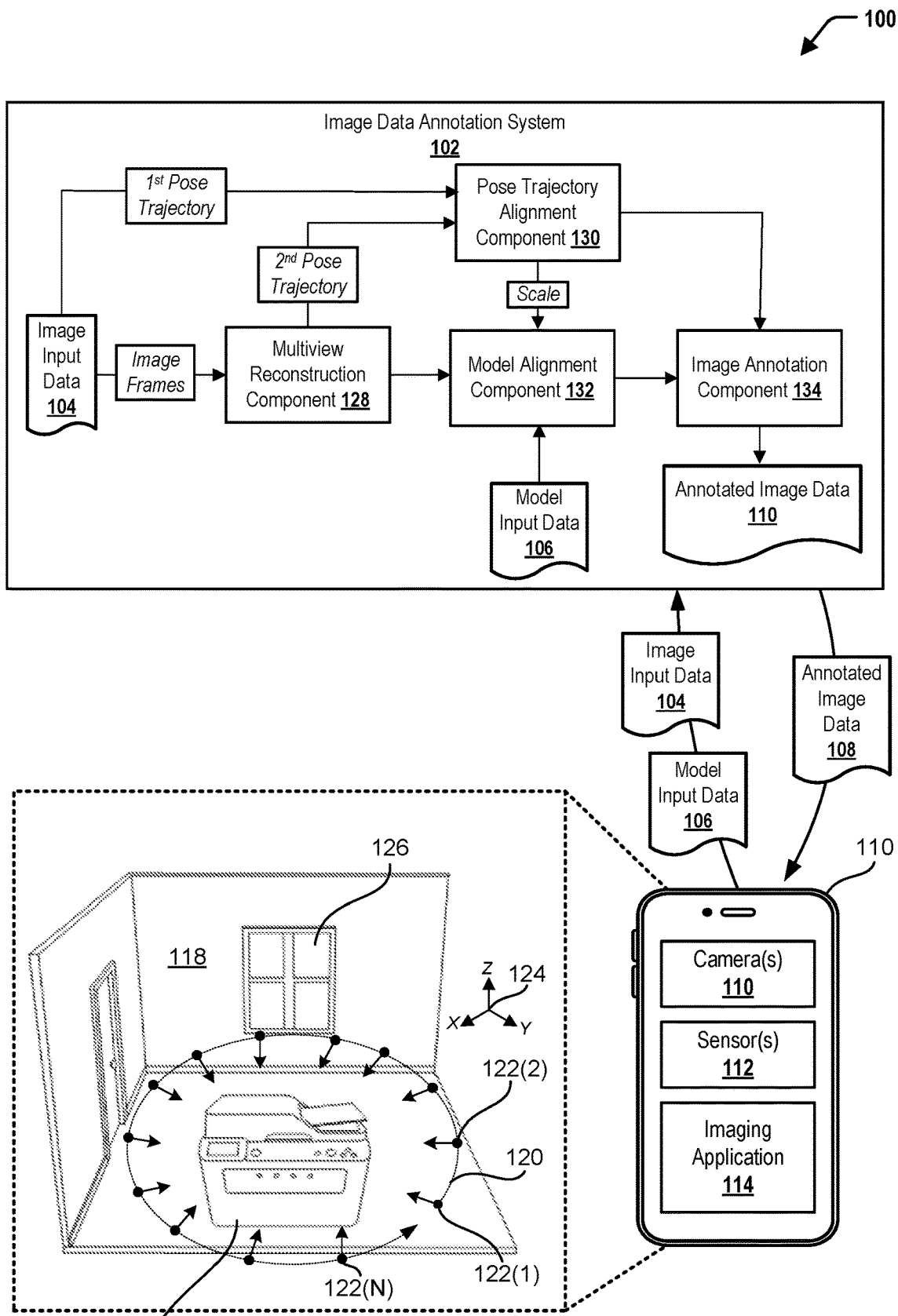
FIG. 1A illustrates an exemplary environment in which an image data annotation system generates annotated image data based on image input data and model input data that is received from a customer system.

FIG. 1A illustrates an exemplary environment 100 in which an image data annotation system 102 receives image input data 104 and model input data 106 from a customer system 110. Then, by performing the operations described in detail below, the image data annotation system 102 automatically annotates the image input data 104 to generate annotated image data 108 that is suitable for training one or more DNNs to perform object detection.

The image input data 104 may comprise a sequence of images such as, for example, a video that is taken of a physical object 116 from multiple viewpoints within a physical environment 118. For example, a user may deploy an imaging application 114 on a computing device that includes one or more cameras 110 that are configured to capture imagery and further includes one or more sensors 112 that are suitable for generating pose information concurrently with the one or more cameras 110 capturing the imagery. For illustrative purposes, presume that a smart phone computing device is utilized to capture a video of the physical object 116 while a user walks around the physical object 116 within the physical environment 118. For example, as illustrated, the user may carry the smart phone computing device along a trajectory 120 while the video of the physical object 116 is being recorded via the camera(s) 110. Furthermore, the imaging application 114 may be configured to generate image pose trajectory data that represents the physical location and/or physical orientation of the smart phone computing device in association with the individual image frames of the video. To graphically illustrate this point, drawn along the trajectory 120 are a plurality of individual points 122 in space that are measured in relation to a reference coordinate system 124. For purposes of the present discussion, each of these individual points 122 represent a point in space at which an individual image frame of the video being generated by the imaging application 114 is captured.

The sensors 112 may include for example, a gyroscope and/or an accelerometer and/or inertial measurement unit (IMU) that enables the smart phone computing device to determine individual poses of the smart phone computing device in association with each individual image frame that is captured. For example, the imaging application 114 may generate 6 Degree-of-Freedom (6DoF) Euclidean poses for each individual image frame within the sequence of images that form the video. Each 6DoF Euclidean pose may be measured from the coordinate system 124, which may be selected by the imaging application 114 based on predefined criteria and/or arbitrarily. It will be appreciated by one skilled in the art of augmented reality that due to the image frame pose trajectories being generated in relation to the individual images of the video, the image input data 104 that is generated by the imaging application 114 includes all information required for determining a true scale of the physical object 116.

The model input data 106 may comprise a three-dimensional (3D) model of the physical object 116. For example, the model input data 106 may be a computer-aided design (CAD) file (e.g., a STEP (Standards for the Exchange of Product Information) file formatted in accordance with ISO 10303) that defines both dimensions and shapes for geometric features of the physical object 116. Exemplary CAD files may be readily generated by use of conventional computer-aided design (CAD) software programs such as, for example, SolidWorks®. In some implementations, the 3D model defined by the model input data 106 is may be an untextured 3D model in the sense that it defines various geometric features of the physical object 116 but may lack texture information that defines certain appearance characteristics of the physical object 116. For example, the model input data 106 may omit definitions of opacity, transparency, reflectivity, color, and so on of the various features and/or individual model parts that make up the 3D model of the physical object 116. It will be appreciated by one skilled in the arts of augmented reality and object recognition that a textured 3D model may typically include a closed cell mesh defined at the outer surfaces of the 3D model and specific colors and/or image files as well as reflectivity properties applied to individual cells of the closed cell mesh.

In the example scenario shown in FIG. 1A, the physical object 116 is illustrated as being a printer unit that is resting on the floor of a room (which in this case is the physical environment 118). Accordingly, in this example scenario, upon receiving the image input data 104 and the model input data 106, the image data annotation system 102 possesses both a video file made up of images of a real-life physical instance of the printer unit in addition to a 3D model (e.g., a STEP-File or other CAD file) that defines geometric features of a virtual instance of the printer unit. As described below, the image data annotation system 102 utilizes these representations of the physical object to generate the annotated image data 110.

Illustrated within the image data annotation system 102 is an exemplary operational flow for utilizing the image input data 104 and model input data 106 to automatically generate the annotated image data 110 by adding certain object annotations to the individual image frames included within the image input data 104. The operations and data flows shown and disclosed in relation to FIG. 1A (and other FIGS. of the present disclosure) are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

As described above, the image input data 104 that is generated by the imaging application 114 may include both image frames and image pose trajectory data defining 6DoF poses in association with the individual image frames. As illustrated, the image data annotation system 102 may enter the image frames of the image input data 104 into a multi-view reconstruction component 128 that generates a multi-view reconstruction of the physical object 116 based on the image frames. The multi-view reconstruction component 128 may be a Structure-from-Motion (SfM) and/or a Multi-View Stereo (MVS) pipeline that generates the multi-view reconstruction at an arbitrary scale. Furthermore, the multi-view reconstruction component 128 may also generate a pose trajectory associated with the sequence of images from the image input data during generation of the multi-view reconstruction of the physical object 116 at the arbitrary scale. Because the multi-view reconstruction component 128 generates the second pose trajectory in association with the same sequence of images for which the imaging application 114 has previously generated the first pose trajectory while capturing the sequence of images, the first pose trajectory and second pose trajectory may be largely similar with the exception of the second pose trajectory lacking true scale information. For example, although the multi-view reconstruction component 128 may extract features of the physical object 116 from the individual image frames, the multi-view reconstruction component 128 does not account for either of the optical parameters of the cameras 110 (e.g., lens characteristics) or the physical distances from the physical object 116 at which each individual image frame was captured within the real-world environment. Therefore, the scale at which the multi-view reconstruction is initially generated is arbitrary and does not necessarily coincide with the true scale of the physical object 116 within the physical environment 118.

To account for the initially arbitrary (and therefore unknown) scale of the multi-view reconstruction that is output from the multi-view reconstruction component 128, each of the first pose trajectory and the second pose trajectory may be provided to a pose trajectory alignment component 130 that determines scale information associated with the multi-view reconstruction. For example, the pose trajectory alignment component 130 may align the second pose trajectory having the unknown scale (and that corresponds to the multi-view reconstruction generated by the multi-view reconstruction component 128) with the first pose trajectory of which the scale is known due to the use of the sensors 112 to determine 6DoF poses for each individual image in relation to the coordinate system 124 of the real-world physical environment 118. Upon aligning the second pose trajectory with the first pose trajectory, the pose trajectory alignment component 130 can reliably extrapolate true scale information for a multi-view reconstruction based on the first pose trajectory generated by the imaging application 114.

As illustrated, a model alignment component 132 then receives the multi-view reconstruction from the multi-view reconstruction component 128 along with the scale of the multi-view reconstruction as determined by the pose trajectory alignment component 130. As further illustrated, the model alignment component 132 receives the model input data 106 that defines the 3D model of the physical object 116. The model alignment component 132 generates alignment data that defines individual alignments of the multi-view reconstruction of the physical object 116 to the 3D model of the physical object 116 in association with individual frames. For example, the model alignment component 132 may mask or composite the 3D model of the physical object 116 onto each individual image frame of a video that is taken by the imaging application 114.

Then, the image annotation component 134 may generate the annotated image data 110 by updating individual image frames to include object annotations that are representative of an orientation of the physical object 116 within the real-world environment 118 in association with each individual image frame that is included within the image input data 104. For example, the image annotation component 134 may modify each individual image frame to include one or more of a 3D bounding box (e.g., a bounding volume) surrounding the physical object 116, a 2D bounding box (e.g., a bounding area) surrounding the physical object 116, an object pose that represents a physical pose of the physical object 116 within the physical environment 118, an image pose that represents an orientation of the viewpoint from which each individual image was captured, an object mask in which the 3D model of the physical object 116 is composited over the graphical representation of the physical object within each individual image frame, and/or depth map information defining geometrical characteristics of the physical object 116 in association with the individual image frame.

In the illustrated scenario, the annotated image data 108 is then provided back to the customer system 110 for use as desired such as, for example, to train a DNN model to recognize the physical object 116 within various real-world environments under diverse and even changing environmental conditions. In this way, rather than having to go through the laborious process of manually annotating the individual image frames within the image input data 104 (a tedious process which as described above typically requires the involvement of highly trained DNN expert personnel), a customer that desires to train a DNN model to reliably recognize the physical object 116 (which in many industrial cases the customer will have already created a 3D CAD model for) may simply provide the 3D CAD model of the physical object 116 along with one or more videos that are taken of the physical object 116 within a real-world physical environment 118 using an appropriate imaging application 114 to the image data annotation system 102. Then, annotated image data 110 may be promptly returned to the customer in a fraction of the time that traditional manual image annotation would have taken and furthermore with a higher degree of accuracy than the manual image annotation can typically achieve. Additionally, or alternatively, the operation of training an object detection architecture (e.g., a DNN model) may take place within the image data annotation system 102. Accordingly, the disclosed techniques represent a marked improvement to the technical fields of object detection and three-dimensional (3D) Simultaneous Localization and Mapping (SLAM).

In order to improve the suitability of the annotated image data 108 to train a DNN to perform object detection under an array of diverse and varying environmental conditions, the image input data 104 may include multiple different sequences of images that are taken of the physical object 116 under various environmental conditions. For example, the image input data 104 may comprise: (i) a first video of the physical object 116 that is taken from multiple viewpoints during daytime lighting conditions when natural light enters the room via a window 126, and (ii) a second video of the physical object 116 that is taken from multiple viewpoints during nighttime lighting conditions when it is dark outside and only artificial light from lightbulbs fills the room. In this way, the various surfaces of the physical object 116 may yield different visible characteristics such as, shadows on certain features (e.g., a printer tray, or boss handle) under nighttime conditions that are not present when natural daylight fills the physical environment 118. In this way, appropriately annotating the individual frames of the image input data 104 according to the techniques described below may yield training data that is suitable for enabling a DNN object detection architecture to "learn" how to reliably recognize the physical object under diverse and even changing environmental conditions.

Figure 1B:
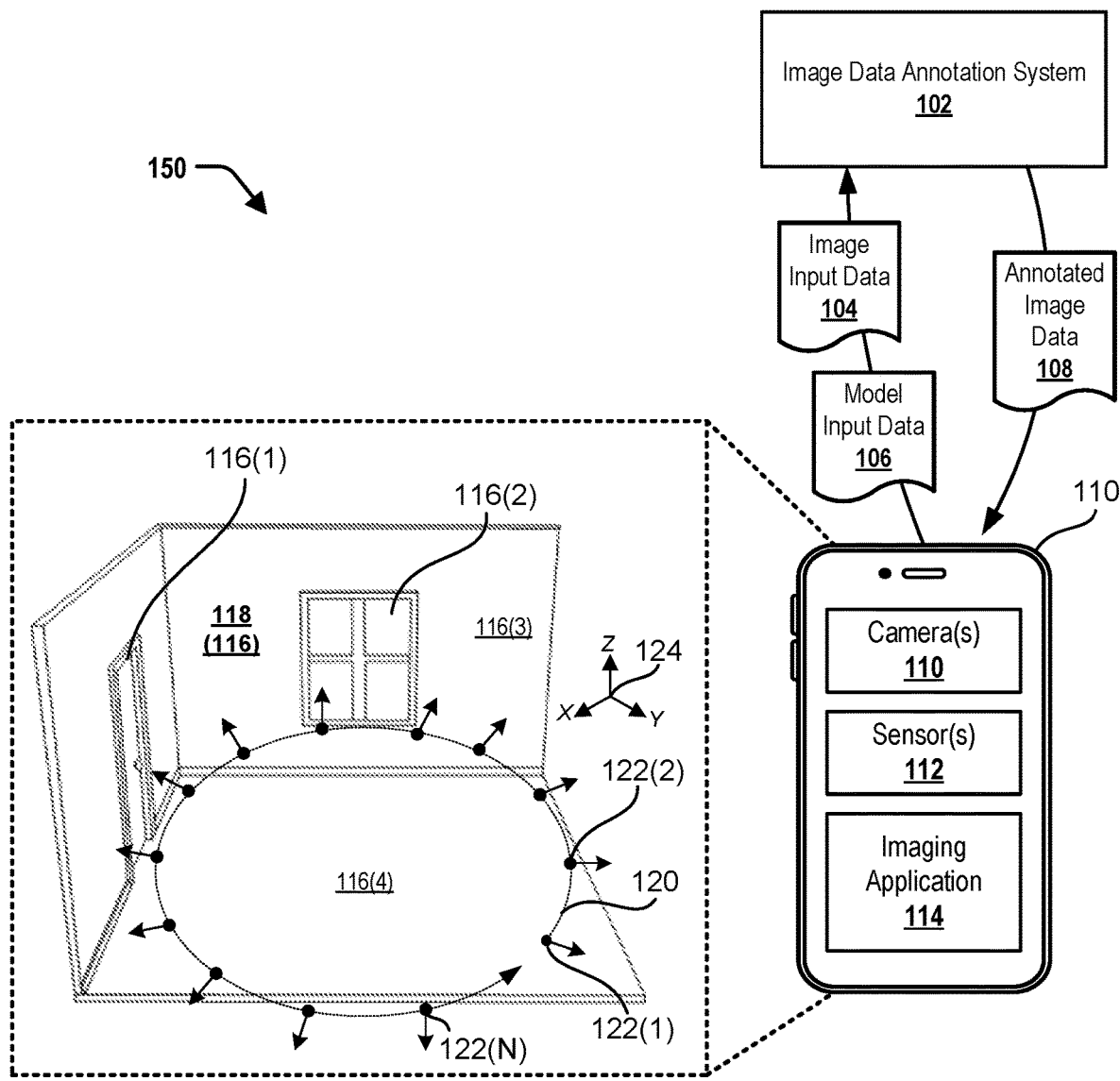
FIG. 1B illustrates an exemplary implementation scenario in which the image data annotation system of FIG. 1A is deployed to apply object annotations to aspects of a physical environment that is modeled in model input data and imaged in image input data.

Turning now to FIG. 1B, illustrated is an exemplary implementation scenario in which the image data annotation system 102 is deployed to apply object annotations to aspects of a physical environment 118. As illustrated in FIG. 1B, the image data annotation system 102 receives image input data 104 and model input data 106 from the customer system 110. As further illustrated, the image data annotation system 102 processes the received image input data 104 and model input data 106 to generate annotated image data 108 in a similar manner to that described in relation to FIG. 1A. Accordingly, aspects of FIG. 1A that are shown and described in relation to the specific process(es) performed by the image data annotation system 102 are omitted from FIG. 1B to avoid redundancies of the present disclosure. However, the implementation scenario of FIG. 1B differs from that of FIG. 1A in the sense that the physical object 116 to which object annotations are applied is the physical environment 118 itself (or at least specific aspects thereof).

As illustrated in FIG. 1B, the image input data 104 may include a sequence of images such as, for example, a video that is taken of the physical environment 118 from multiple viewpoints. For example, as illustrated, a user may carry a smart phone along a trajectory within the physical environment 118 to while capturing video of various aspects of the physical environment 118 such as, for example, a door (labeled within FIG. 1B as a first physical object 116(1)), a window (labeled within FIG. 1B as a second physical object 116(2)), a wall (labeled within FIG. 1B as a third physical object 116(3)), and a floor (labeled within FIG. 1B as a fourth physical object 116(4)). To graphically illustrate this point, the image poses shown along the trajectory 120 are illustrated as pointing outward such that the physical objects 116 of interest correspond to aspects of the physical environment 118 itself.

Figure 2A:
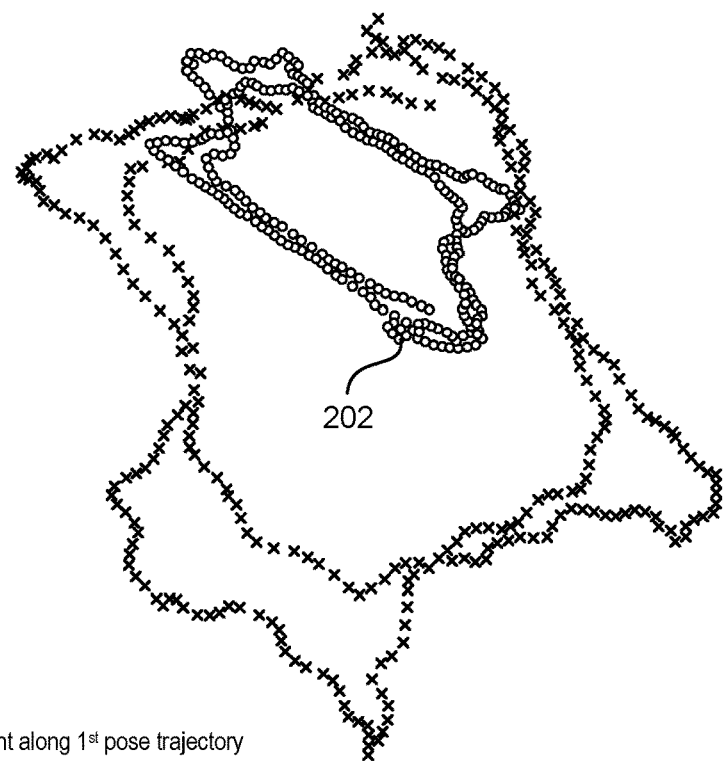
FIG. 2A illustrates an exemplary first pose trajectory (which may be generated by the imaging application during generation of the image input data) in an unaligned state with respect to an exemplary second pose trajectory (which may be generated during generation of a multi-view reconstruction from the image input data).
Figure 2B:
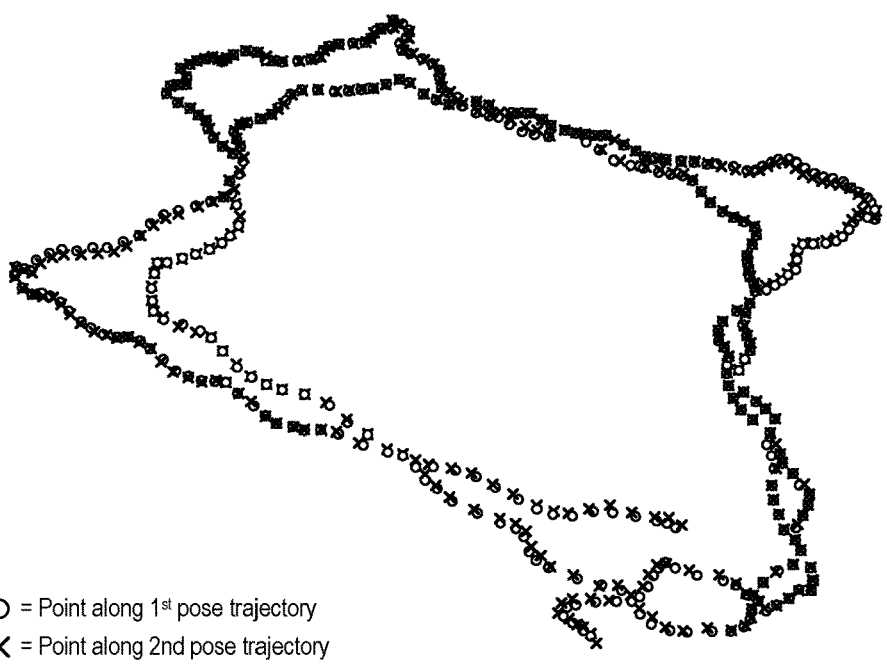
FIG. 2B illustrates the exemplary first pose trajectory of FIG. 2A in an aligned state with respect to the exemplary second pose trajectory of FIG. 2A. The aligned state shown in FIG. 2B represents a state in which the squares and crosses are perfectly (or almost perfectly) aligned whereas in the unaligned state shown in FIG. 2A the squares and crosses are arbitrarily located with respect to one another.

Turning now to FIGS. 2A and 2B, illustrated are an exemplary first pose trajectory and an exemplary second pose trajectory prior to and subsequent to alignment, respectively. FIGS. 2A and 2B are discussed collectively to convey aspects of the pose trajectory alignment operation that is performed to determine scale information in association with the multi-view reconstruction. The first pose trajectory and second pose trajectory of FIGS. 2A and 2B correspond to the first pose trajectory and second pose trajectory of FIG. 1A. Furthermore, the adjustment of the relative scale and orientation of the first pose trajectory with respect to the second pose trajectory shown in FIG. 2B, corresponds to the alignment operation that is performed by the pose trajectory alignment component 130.

Referring specifically to FIG. 2A, illustrated is an exemplary first pose trajectory 202 (which may be generated by the imaging application 114 during generation of the image input data 104) in an unaligned state with respect to an exemplary second pose trajectory 204 (which may be generated by the multi-view reconstruction component 128 during generation of the multi-view reconstruction from the image input data 104). In accordance with the key shown in relation to each of FIGS. 2A and 2B, individual points along the first pose trajectory 202 are represented by individual "o" symbols whereas individual points along the second pose trajectory 204 are represented by individual "×" symbols. As shown in FIG. 2A, significant differences exist between the scale, location, and orientation of the first pose trajectory in relation to the second pose trajectory. However, due to each of the first pose trajectory 202 and second pose trajectory 204 representing the same sequence of images in different coordinate systems and at different scales, these two pose trajectories can be aligned via a 3D similarity transformation to apply the known scale from the first pose trajectory 202 to the second pose trajectory 204 for which scale is initially unknown. It is worth noting that although each point (individual "o" symbol and individual "×" symbol) shown represents a 3DoF pose, only camera origin is shown to reduce illustrative clutter.

An exemplary imaging application 114 that is capable of generating the first pose trajectory 202 may include computing applications that are designed for augmented reality application development such as, for example, ARCore by GOOGLE and/or ARKit by APPLE. Such computing applications may operate on a device equipped with sensors 112 and cameras (e.g., a typical smartphone computing device) and may utilize these sensors 112 to keep track of both the position and orientation of the device within a real-world environment. For example, the imaging application 114 may implement visual inertial odometry (VIO) to utilize data that is generated both from the sensors 112 and the camera 110 to precisely monitor spatial movements across six axes. Accordingly, the imaging application 114 may store a camera origin and camera orientation for each image frame which capturing video and/or a sequence of discrete still images.

An exemplary multi-view reconstruction component 128 that is capable of generating the second pose trajectory 204 may include, for example, various Structure-from-Motion (SfM) and/or Multi-View Stereo (MVS) pipelines that generate dense point clouds that represent physical objects in 3D based on ordered and/or unordered images of the physical objects. One exemplary and commonly available such multi-view reconstruction component 128 is COLMAP 3.6. It will be appreciated that such applications may generate 3D multi-view reconstructions in relation to an arbitrary coordinate system and at an arbitrary scale that optimizes an unknown gauge transformation of the resulting SfM and/or MVS reconstruction.

Turning now to FIG. 2B, illustrated is the exemplary first pose trajectory 202 generated by the imaging application 114 in an aligned state with respect to the exemplary second pose trajectory 204 generated by the multi-view reconstruction component 128. For example, the pose trajectory alignment component 130 may modulate the orientation of one or both of the first pose trajectory 202 or the second pose trajectory 204 to align (or at least substantially align) the camera origins associated with each individual image frame. In this way, the coordinate system of the second pose trajectory 204 may be aligned to the coordinate system of the first pose trajectory 202 (i.e., the coordinate system in which the physical object 116 is represented within the image input data 104).

In some implementations, the pose trajectory alignment component 130 may compute Euclidean invariant 3D features such as, for example, Fast Point Feature Histogram (FPFH) features in both of the multi-view reconstruction (e.g., the dense point cloud generated by the multi-view reconstruction component 128) and the 3D model defined within the model input data 106. This is because FPFH features are useful for matching correspondence locations between two discrete point clouds (and/or other 3D representations of objects) under arbitrary Euclidean transformations. Random sample consensus (RANSAC) techniques may then be utilized to search the pose space by sampling a small set of FPFH features and, ultimately, to compute a Euclidean transformation between the multi-view reconstruction (which may be represented as a first point cloud) and the 3D model (which may be represented as a second point cloud) that leads to the largest number of inlier correspondences. In some implementations such as, for example, if the object is a very small fraction of the total points in the reconstructed scene, recent techniques such as MAGSAC can be used instead of RANSAC. The designated inliers are then used to refine the pose between the two separate point clouds using ICP (Iterated Closest Point) algorithm.

By performing the pose transformation techniques described above to align the first pose trajectory and the second pose trajectory, the pose trajectory alignment component 130 brings the captured image frames and the 3D model into the same coordinate system. Notably, this is achieved without any direct association between the image frames (that are generated by the imaging application 114 and received in the image input data 104) and the 3D model defined by the model input data 106. By doing so, the techniques described herein enable the 3D model, its 3D bounding box, and other relevant information to be extracted from the 3D model and projected into each image frame to obtain the segmentation mask of the physical object 116, the projection of its 3D bounding box of the physical object 116, and the projection of the 2D bounding box of the physical object 116.

Figure 3:
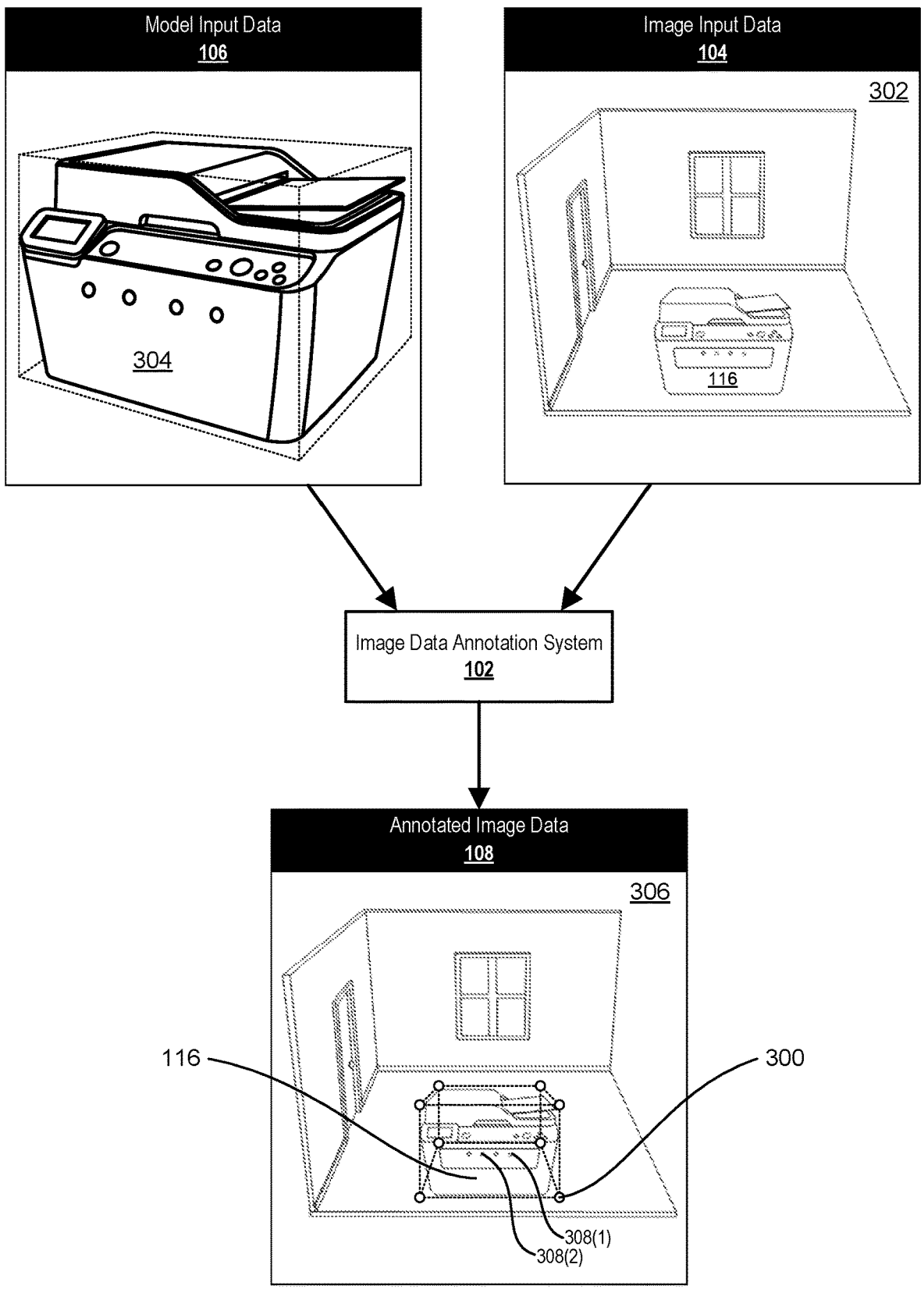
FIG. 3 illustrates exemplary annotated image data that corresponds to an individual image frame of the image input data that has been annotated with various object annotations based on the model input data.

Turning now to FIG. 3, illustrated is exemplary annotated image data 108 that corresponds to an individual image frame 302 of the image input data 104 that has been annotated with various object annotations 300 based on the model input data 106. As illustrated, each of the model input data 106 that defines the 3D CAD model 304 of the physical object 116 and the image input data 104 that includes the individual image frame 302 (in addition to multiple other image frames) are provided to the image data annotation system 102. In accordance with various techniques described herein, the image data annotation system 102 then generates an instance of alignment data that defines an individual and highly precise alignment of the 3D CAD model 304 with respect to the physical object 116 as shown in the individual image frame 302. For example, the instance of alignment data may define an individual alignment of the 3D CAD model 304 to the individual discrete orientation of the multi-view reconstruction that corresponds to the individual image frame 302. This enables the 3D CAD model 304 to be reliably and accurately projected onto the individual frame 302 (and each other frame of a video sequence for that matter).

Based on the alignment data, the image data annotation system 102 generates an annotated image frame 306 that includes the object annotations 300. As described above, the addition of the object annotations 300 to the individual image frames 302 converts the image input data 104 into a form of training data that is suitable to "train" a DNN to recognize the physical object 116 (that is represented in both the 3D CAD model 116 and pictured in the image input data 104) under diverse and even changing environmental conditions. The specific type of object annotation 300 that is shown in FIG. 3 is a 3D bounding box (a.k.a. a bounding volume) that represents an imaginary closed volume that completely contains the physical printer 116 shown in the individual image frame 302. That is, if the closed volume were to exist in the real-world environment shown in the individual image frame 302, then the physical printer 116 would be tightly contained within the closed volume defined by the 3D bounding box. Additionally, or alternatively, the object annotation 300 may represent within one or more individual image frames a 2D Bounding box around the physical object 116, an object pose, an image pose, and/or a depth map representation of the physical object 116.

As further shown in FIG. 3, the annotations added to the image frame 302 may include model specific annotations such as, for example, the locations and names of various features of the physical object 116. For example, as illustrated, a first button 308(1) and a second button 308(2) are each labeled within the annotated image data 108.

Figure 4:
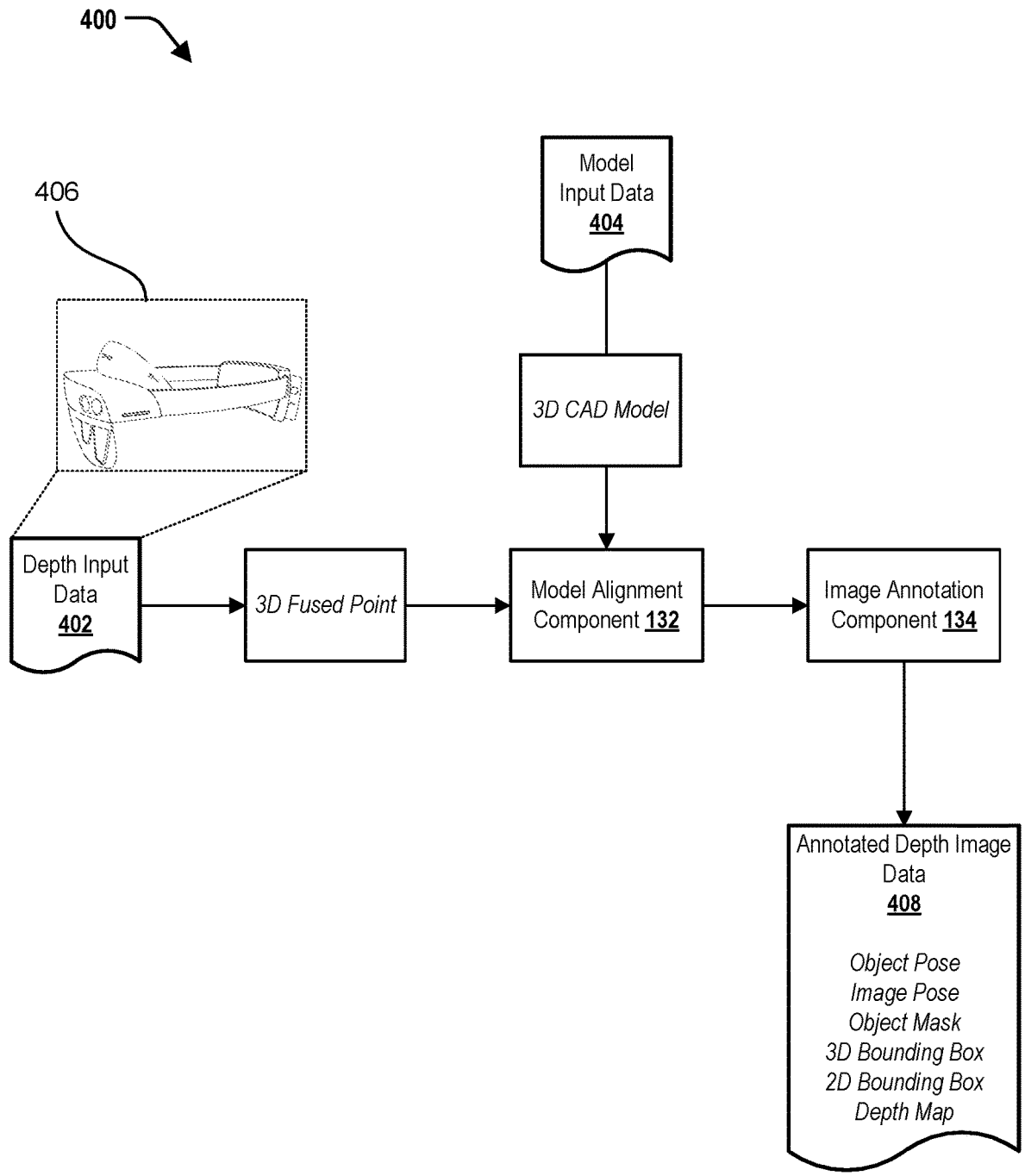
FIG. 4 illustrates an exemplary process flow in which a system may generate annotated "depth" image data based on depth input data that is generated by one or more depth sensors and model input data that is generated by a CAD application.

FIG. 4 illustrates an exemplary process flow 400 in which a system (such as the image data annotation system 102) may generate annotated depth image data 408 based on depth input data 402 that is generated by one or more depth sensors and model input data 106 that is generated by a CAD application. The one or more depth sensors may be integrated into a computing device such as, for example, a head-mounted display (HMD) device 406 as illustrated. Similar to as described in relation to FIG. 1A, the model input data 106 may comprise a three-dimensional (3D) model of the physical object 116. The depth input data 402 may comprise a 3D fused point cloud that is generated by the computing device and that represents a 3D physical real-world environment in which a physical object of interest is located.

In an exemplary implementation, the depth data 402 may be generated by the HMD device 406 while it is being donned by a user who is walking around the physical object within a real-world environment while the depth sensors that are integrated into the HMD device 406 generate data that represents physical structures, including but not limited to the physical object, that are present within the real-world environment. The depth data 402 may include individual frames of pixel-based depth images (a.k.a. depth maps). As used herein, the term pixel-based depth image refers to an image comprised of individual depth values that uniquely correspond to individual pixels within an array of pixels. Each individual depth value represents a distance from a viewpoint (e.g., a lens of a TOF camera) to a point on a surface within a scene corresponding to that image. The computing device may generate the 3D fused point cloud based on a combination of depth data that is generating by one or more time-of-light (ToF) range cameras and pose data that is generated by one or more tracking cameras and/or inertial measurement units (IMUs). The depth data and pose data may be utilized to map the physical environment by generating a point cloud that is fused into a 3D triangular mesh that represents the geometric features of any objects within the physical environment.

As illustrated, each of the 3D CAD model and the 3D fused point cloud may be provided to the model alignment component 132. The model alignment component 132 generates alignment data that defines individual alignments of the 3D CAD model of the physical object 116 onto a portion of the 3D fused point cloud in association with individual frames of the depth data 402. For example, the model alignment component 132 may mask or composite the 3D CAD model of the physical object 116 onto each individual frame of the depth data 402.

Then, in image annotation component 134 may generate the annotated depth image data 408 by updating individual image frames to include object annotations that are representative of an orientation of the physical object 116 within the real-world environment 118 in association with each individual frame that is included within the depth input data 402. For example, the image annotation component 134 may modify each individual image frame to include one or more of a 3D bounding box surrounding the physical object 116, a 2D bounding box surrounding the physical object 116, an object pose that represents a physical pose of the physical object 116 within the physical environment 118, an image pose that represents an orientation of the viewpoint from which each individual image was captured, an object mask in which the 3D model of the physical object 116 is composited over the graphical representation of the physical object within each individual image frame, and/or depth map information defining geometrical characteristics of the physical object 116 in association with the individual frame.

The annotated depth image data 408 generated by the process 400 may be utilized to train a DNN model to recognize the physical object 116 within various real-world environments based on later captured real-time depth data. For example, upon performing the process 400 to generate the annotated depth image data 408, a DNN model may be trained to recognize and determine a spatial location and orientation for the physical object based on different frames of depth data that are captured by the computing device during a real-life use case scenario.

Figure 5:
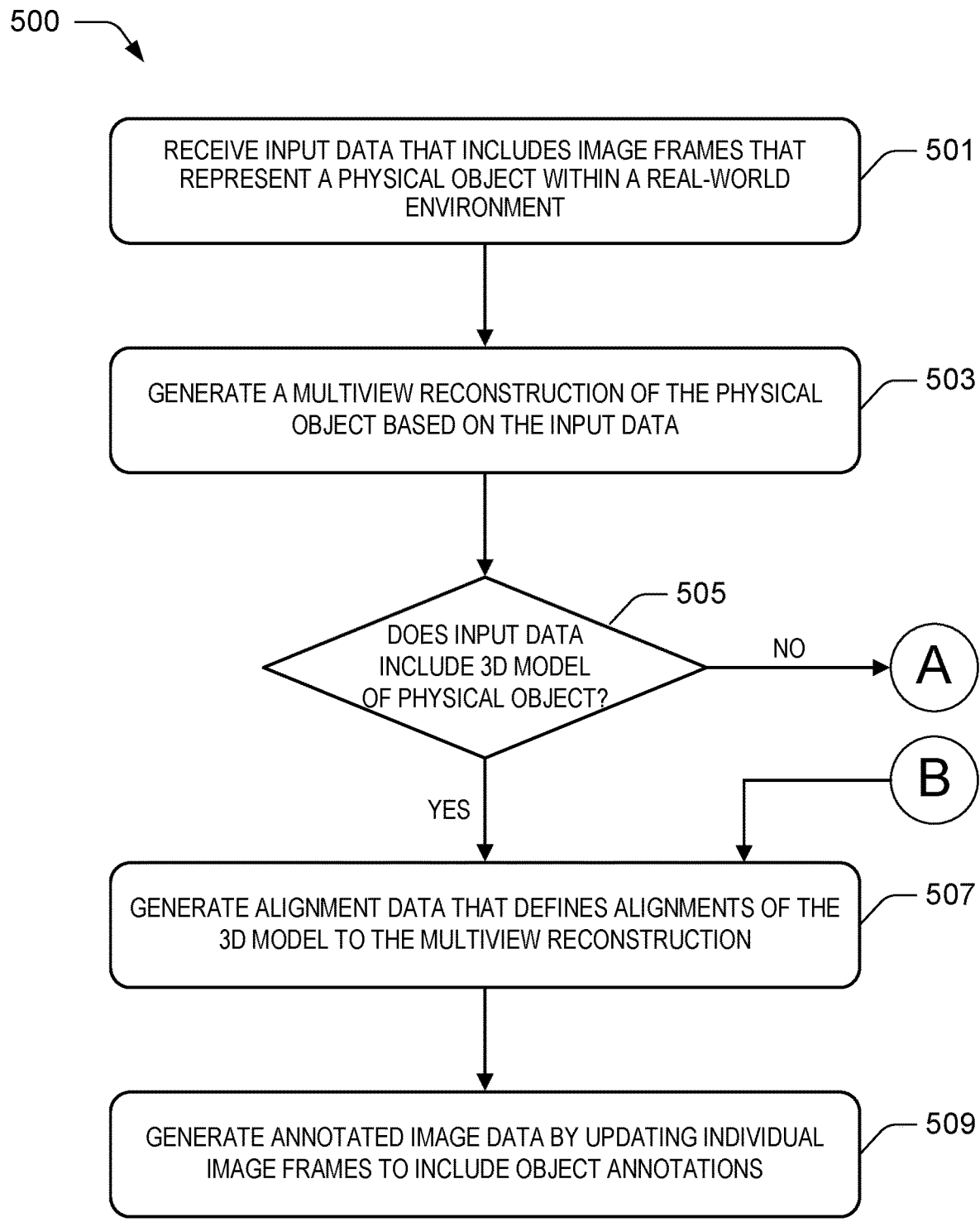
FIG. 5 illustrates a process that facilitates automatically annotating a physical object within individual images frames with relevant object annotations based on a three-dimensional (3D) model of the physical object.

Turning now to FIG. 5, a process 500 is describe that facilitates automatically annotating a physical object within individual images frames with relevant object annotations based on a three-dimensional (3D) model of the physical object. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

At operation 501 of the process 500, a system such as, for example, the image data annotation system 102 receives input data that includes images of a physical object 116 from multiple viewpoints within a physical environment 118. For example, as described in relation to FIG. 1A, a user may deploy the imaging application 114 to capture imagery and pose information in association with a video file.

At operation 503 of the process 500, the system may generate a multi-view reconstruction of the physical object based on the image data. For example, the system may extract geometric features in association with the multiple viewpoints to generate a dense point cloud representation of the physical object.

At operation 505 of the process 500, the system may determine whether the input data includes a 3D model of the physical object. For example, as shown in relation to FIG. 1A, the input data provided by a customer system may include image input data and model input data.

If the input data does include the 3D model of the physical object, the process 500 may proceed to operation 507 at which the system generates alignment data that defines individual alignments of the multi-view reconstruction of the physical object 116 to the 3D model of the physical object 116 in association with individual frames. For example, as described in relation to FIG. 1A, the image annotation system may mask or composite the 3D model of the physical object 116 onto each individual image frame of a video that is taken by the imaging application.

At operation 509, the system may generate annotated image data by updating individual image frames to include object annotations that are representative of an orientation of the physical object 116 within the real-world environment in association with each individual image frame that is included within the image input data. For example, the image annotation component 134 may modify each individual image frame to include one or more of a 3D bounding box (e.g., a bounding volume) surrounding the physical object 116, a 2D bounding box (e.g., a bounding area) surrounding the physical object 116, an object pose that represents a physical pose of the physical object 116 within the physical environment 118, an image pose that represents an orientation of the viewpoint from which each individual image was captured, an object mask in which the 3D model of the physical object 116 is composited over the graphical representation of the physical object within each individual image frame, and/or depth map information defining geometrical characteristics of the physical object 116 in association with the individual image frame.

Figure 6:
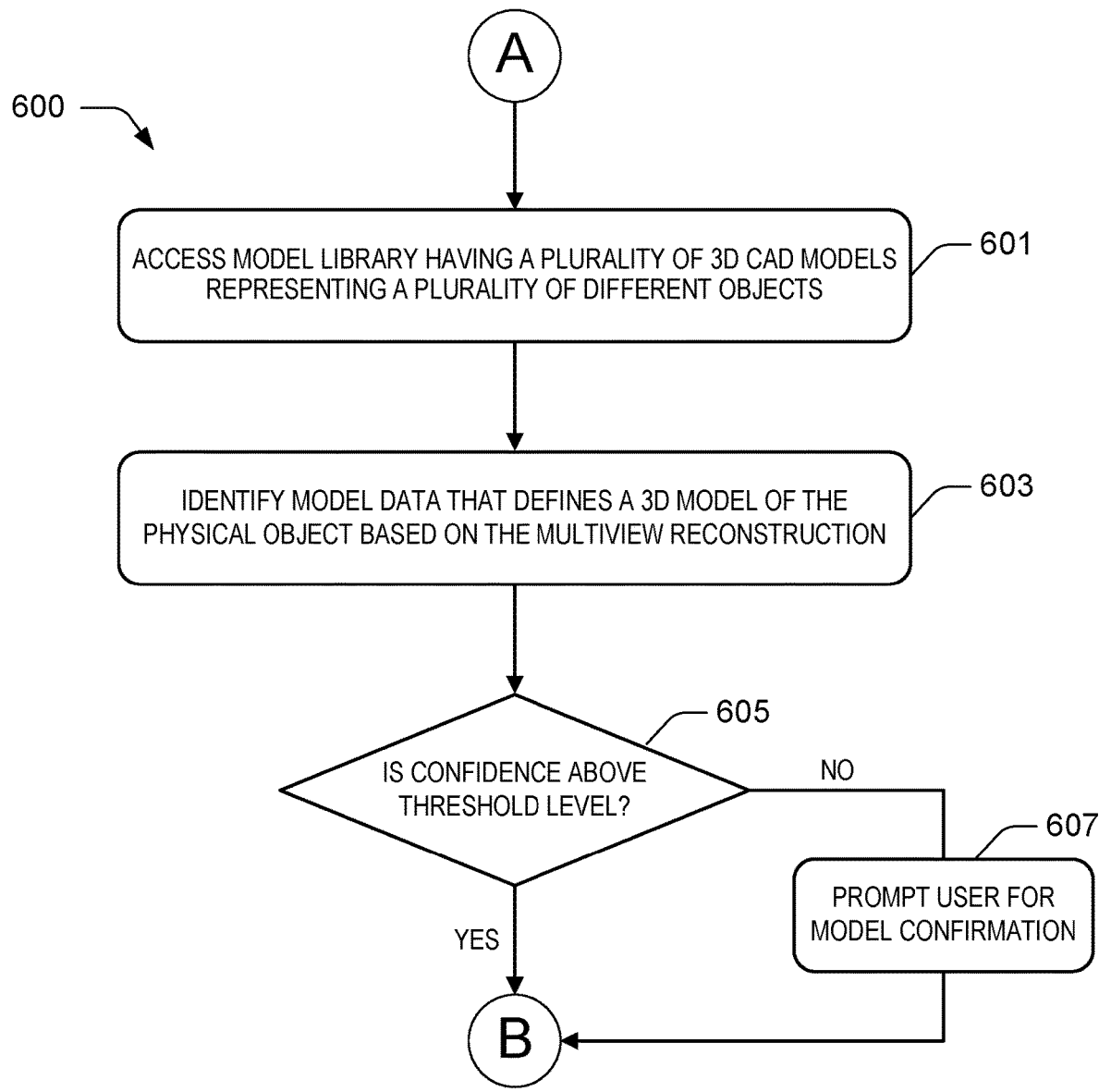
FIG. 6 illustrates an exemplary process in which the system can obtain a 3D model of the physical object under circumstances where the initially received input data omits the model input data defining the 3D model of the physical object.

Turning now to FIG. 6, an exemplary process 600 is illustrated in which the system can obtain a 3D model of the physical object under circumstances where the initially received input data omits the model input data defining the 3D model of the physical object.

Referring briefly back to operation 505 of FIG. 5, if the input data does not include a 3D model of the physical object, then the process can proceed to operation 601 shown in FIG. 6. At operation 601, the system may access a model library having a plurality of 3D CAD models that represent a variety of different objects. For example, a model library for a typical enterprise may include 3D CAD models for some or all of the various products offered and/or designed by that enterprise.

At operation 603, the system may identify model data that defines a 3D model of the physical object (that is represented in the input data) based on the multi-view reconstruction. For example, the system may analyze individual model files (e.g., STEP Files) within the model library and identify a particular model file that matches the multi-view reconstruction.

At operation 603, the system may determine whether a confidence level, associated with the degree to which the Multi-view reconstruction matches the identified model, is above a threshold level. If the confidence is above the threshold level, then the system may advance to the operation 507 shown in FIG. 5. If, on the other hand, the confidence is below the threshold level, then the system may proceed to operation 607 at which the system prompts a user for confirmation as to whether the identified 3D model is correct. That is, a confirmation that the 3D model selected from the model library based on the Multi-view reconstruction is in fact a 3D model of the physical object shown in the image input data.

The present invention is believed to be applicable to a variety of systems and approaches involving automatic generation of training data that includes annotations of a physical real-world object. Aspects of the invention disclosed herein are predominantly described in the context of automatically applying annotations to a physical object (e.g., such as a printer) that is located within a larger physical environment. While the present invention is not necessarily limited to such implementations, an appreciation of various aspects of the invention is best gained through a discussion of examples in such a context. However, various other scenarios of automatically applying annotations to a physical object are considered variations of the disclosed techniques and are within the scope of the claims unless the claim language as filed or amended expressly precludes such scenarios. In various implementations the techniques described and claimed herein may be applicable to scenarios in which the physical object to which annotations are automatically applied is a physical real-world environment and/or aspects of interest within the physical real-world environment. For example, the techniques described herein may be used to apply (to image frames) annotations of a door within a room (i.e., the physical object in this context) for which a 3D model is obtained, a window within the room, locations of walls within the room, and so on. Accordingly, it will be appreciated that the techniques disclosed herein may be applicable to automatically generating training data for purposes of training a SLAM DNN model.

Figure 7:
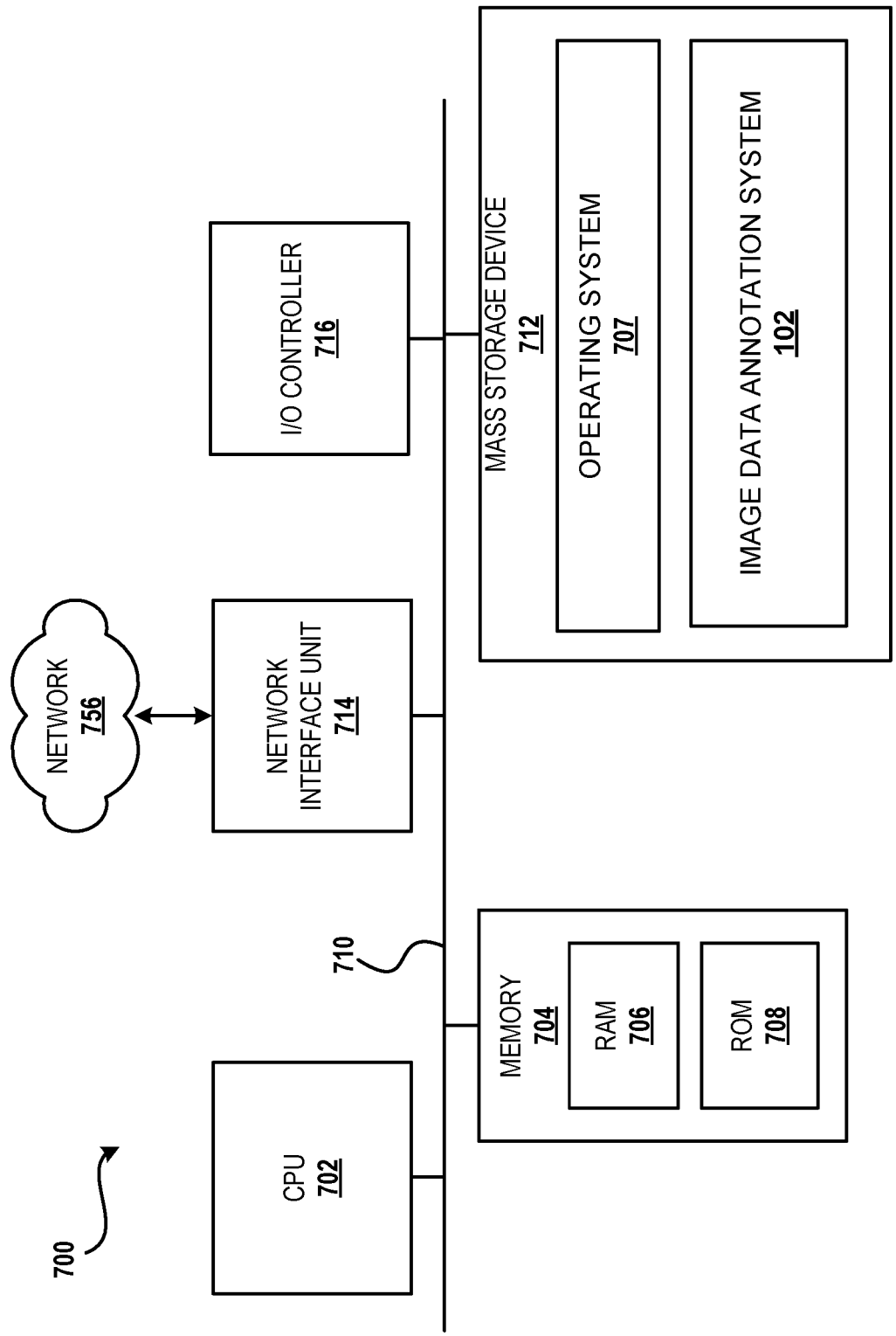
FIG. 7 shows additional details of an example computer architecture for a computer, such as such as a server and/or server cluster, capable of executing the program components described herein.

FIG. 7 shows additional details of an example computer architecture 700 for a computer, such as such as a server and/or server cluster, capable of executing the program components described herein. Thus, the computer architecture 700 illustrated in FIG. 7 illustrates an architecture for a server computer, a mobile phone, a PDA, a smart phone, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 707, other data, and one or more applications, such as the analysis module 129. The mass storage device 712 can also store computer-executable instruction for implementing the image data annotation system 102.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Figure 8:
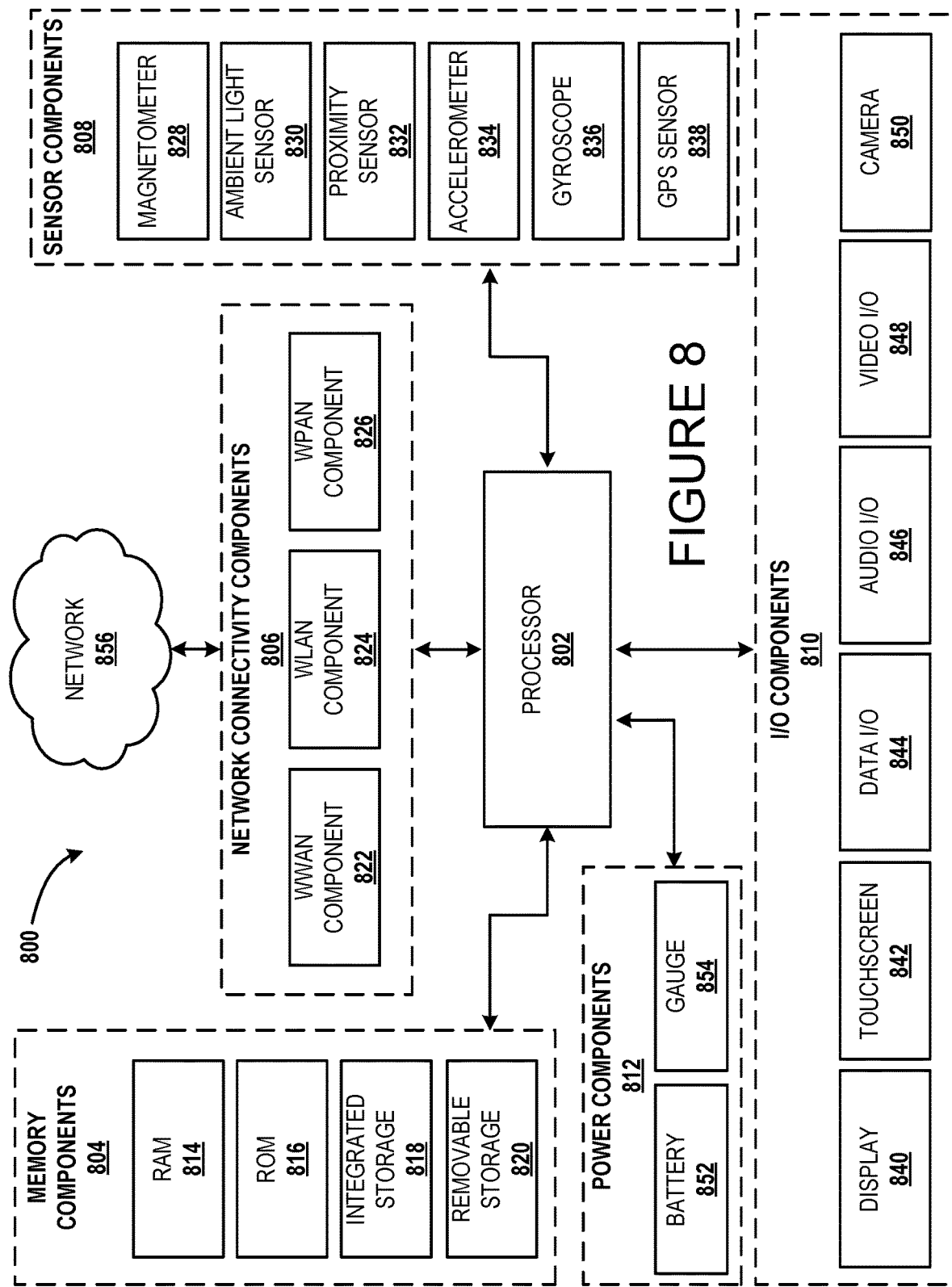
FIG. 8 is an illustrative computing device architecture for a computing device that is capable of executing various software components described herein for enabling the techniques disclosed herein.

Turning now to FIG. 8, an illustrative computing device architecture 800 for a computing device that is capable of executing various software components described herein for enabling the techniques disclosed herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1A and FIG. 7. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1A and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 804 of FIG. 8. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

EXAMPLE CLAUSES

Example 1

A computer-implemented method, comprising: receiving image input data that includes a plurality of image frames that graphically represent multiple viewpoints of a physical object within a real-world environment; receiving model input data that defines a three-dimensional (3D) model of the physical object; generating a multi-view reconstruction of the physical object based on the multiple viewpoints of the physical object that are graphically represented within the plurality of image frames; generating, in association with individual image frames of the plurality of image frames, alignment data that defines individual alignments of the multi-view reconstruction, of the physical object, to the 3D model of the physical object; and generating, based on the alignment data, annotated image data by updating the individual image frames to include object annotations that represent at least one of: a location of the physical object within the real-world environment, or an orientation of the physical object within the real-world environment.

Example 2

The computer-implemented method of Example 1, further comprising: receiving image frame pose trajectory data that defines individual image poses for the individual image frames in relation to a coordinate system; and determining a scale associated with the multi-view reconstruction of the physical object based on the image frame pose trajectory data.

Example 3

The computer-implemented method of Example 2, wherein the generating the alignment data is based on: the scale associated with the multi-view reconstruction of the physical object; and one or more dimensions that are defined, within the model input data, for the 3D model of the physical object.

Example 4

The computer-implemented method of Example 1, further comprising: receiving a first pose trajectory that corresponds to generation of the plurality of image frames that graphically represent the multiple viewpoints of the physical object within the real-world environment; receiving a second pose trajectory that corresponds to generation of the multi-view reconstruction based on the multiple viewpoints of the physical object; determining a scale corresponding to the multi-view reconstruction based on the first pose trajectory and the second pose trajectory, wherein generating the alignment data is based on the scale corresponding to the multi-view reconstruction.

Example 5

The computer-implemented method of Example 4, wherein determining the scale corresponding to the multi-view reconstruction comprises aligning the first pose trajectory to the second pose trajectory.

Example 6

The computer-implemented method of Example 1, wherein the generating the multi-view reconstruction includes generating a point cloud representation of the physical object based on the multiple viewpoints.

Example 7

The computer-implemented method of Example 1, wherein the annotated image data is formatted in accordance with a predefined training data format corresponding to one or more artificial neural network models.

Example 8

The computer-implemented method of Example 1, wherein the object annotations that represent the orientation or the location of the physical object within the real-world environment include at least one of: individual object poses of the physical object within the individual images; object masks within the individual images; or individual 3D bounding boxes corresponding to the physical object within the individual images.

Example 9

The computer-implemented method of Example 1, wherein the plurality of image frames are a plurality of depth images that define individual depth values for individual pixels of a pixel array.

Example 10

A system comprising: one or more processing units; and a computer-readable storage medium having computer-executable instructions stored thereupon, which, when executed by the one or more processing units, cause the one or more processing units to: receive image input data that includes a sequence of image frames that represent a physical object, within a real-world environment, from multiple viewpoints; receive model input data that defines a three-dimensional (3D) model of the physical object; generate alignment data that defines individual alignments of the 3D model in association with individual image frames of the sequence of image frames; generate, based on the alignment data, annotated image data by updating the individual image frames to include object annotations that represent at least one of: a location of the physical object, or an orientation of the physical object.

Example 11

The system of Example 10, wherein the computer-executable instructions further cause the one or more processing units to: generate a multi-view reconstruction of the physical object based on the multiple viewpoints of the physical object that are graphically represented within the plurality of image frames, wherein the individual alignments are determined based on orientations of the multi-view reconstruction, of the physical object, associated with the individual image frames.

Example 12

The system of Example 11, wherein the computer-executable instructions further cause the one or more processing units to: identify the model input data that defines the 3D model of the physical object based on the multi-view reconstruction of the physical object.

Example 13

The system of Example 11, wherein the generating the multi-view reconstruction includes generating a point cloud representation of the physical object based on the multiple viewpoints.

Example 14

The system of Example 10, wherein: the image input data further includes image frame pose trajectory data that defines individual image poses for the individual image frames in relation to a coordinate system, and the generating the alignment data is based on the image frame pose trajectory data.

Example 15

The system of Example 10, wherein the individual image frames of the sequence of image frames are depth images that define individual depth values for individual pixels of a pixel array.

Example 16

A computer-readable storage media having instructions stored thereupon which, when executed by a processor, cause a computing device to: receive image input data that includes image frames showing a physical object within a real-world environment; receive model input data that defines a three-dimensional (3D) model of the physical object; generate a multi-view reconstruction of the physical object based on the image input data; generate, in association with individual ones of the image frames, alignment data that defines individual alignments of the multi-view reconstruction to the 3D model; and generate, based on the alignment data, annotated image data by updating the individual image frames to include object annotations that represent at least one of: a location of the physical object within the real-world environment, or an orientation of the physical object within the real-world environment.

Example 17

The computer-readable storage media of Example 16, further comprising: receiving image frame pose trajectory data associated with the image input data; and determining a scale associated with the multi-view reconstruction of the physical object based on the image frame pose trajectory data.

Example 18

The computer-readable storage media of Example 17, wherein the generating the alignment data is based on the scale associated with the multi-view reconstruction of the physical object.

Example 19

The computer-readable storage media of Example 16, wherein the instructions further cause the processor to: receive a first pose trajectory that corresponds to generation of the image frames; receive a second pose trajectory that corresponds to generation of the multi-view reconstruction; determine a scale corresponding to the multi-view reconstruction based on the first pose trajectory and the second pose trajectory.

Example 20

The computer-readable storage media of Example 19, wherein determining the scale corresponding to the multi-view reconstruction comprises aligning the first pose trajectory to the second pose trajectory.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:
1. A computer-implemented method, comprising:
receiving image input data that includes a plurality of image frames that graphically represent multiple viewpoints of a physical object within a real-world environment;

accessing model input data that defines a three-dimensional (3D) model of the physical object, the model input data being separate from the image input data;

generating a multi-view reconstruction of the physical object based on the multiple viewpoints of the physical object that are graphically represented within the plurality of image frames;

receiving a first pose trajectory that corresponds to generation of the plurality of image frames that graphically represent the multiple viewpoints of the physical object within the real-world environment;

receiving a second pose trajectory that corresponds to generation of the multi-view reconstruction based on the multiple viewpoints of the physical object;

determining a scale corresponding to the multi-view reconstruction based on the first pose trajectory and the second pose trajectory;

generating, in association with individual image frames of the plurality of image frames and based on the scale corresponding to the multi-view reconstruction, alignment data that defines individual alignments of the multi-view reconstruction, of the physical object, to the 3D model of the physical object; and generating, based on the alignment data, annotated image data by updating the individual image frames to include object annotations that represent at least one of:
  a location of the physical object within the real-world environment, or
  an orientation of the physical object within the real-world environment.

2. The computer-implemented method of claim 1, wherein determining the scale corresponding to the multi-view reconstruction comprises aligning the first pose trajectory to the second pose trajectory.

3. The computer-implemented method of claim 1, wherein the generating the multi-view reconstruction includes generating a point cloud representation of the physical object based on the multiple viewpoints.

4. The computer-implemented method of claim 1, wherein the annotated image data is formatted in accordance with a predefined training data format corresponding to one or more artificial neural network models.

5. The computer-implemented method of claim 1, wherein the object annotations that represent the orientation or the location of the physical object within the real-world environment include at least one of:
  individual object poses of the physical object within the individual images;
  object masks within the individual images; or
  individual 3D bounding boxes corresponding to the physical object within the individual images.

6. The computer-implemented method of claim 1, wherein the plurality of image frames are a plurality of depth images that define individual depth values for individual pixels of a pixel array.

7. A system comprising:
  one or more processing units; and
  a computer-readable storage medium having computer-executable instructions stored thereupon, which, when executed by the one or more processing units, cause the one or more processing units to:
    receive image input data that includes a sequence of image frames that represent a physical object, within a real-world environment, from multiple viewpoints;
    access model input data that defines a three-dimensional (3D) model of the physical object, the model input data being separate from the image input data;
    generate a multi-view reconstruction of the physical object based on the multiple viewpoints;
    receive a first pose trajectory that corresponds to generation of the sequence of image frames that represent the physical object from the multiple viewpoints;
    receive a second pose trajectory that corresponds to generation of the multi-view reconstruction based on the multiple viewpoints;
    determine a scale corresponding to the multi-view reconstruction based on the first pose trajectory and the second pose trajectory;
    generate, based on the scale corresponding to the multi-view reconstruction, alignment data that defines individual alignments of the 3D model in association with individual image frames of the sequence of image frames;
    generate, based on the alignment data, annotated image data by updating the individual image frames to include object annotations that represent at least one of:
      a location of the physical object, or
      an orientation of the physical object.

8. The system of claim 7, wherein the multiple viewpoints of the physical object are graphically represented within the plurality of image frames, wherein the individual alignments are determined based on orientations of the multi-view reconstruction, of the physical object, associated with the individual image frames.

9. The system of claim 8, wherein the computer-executable instructions further cause the one or more processing units to:
  identify the model input data that defines the 3D model of the physical object based on the multi-view reconstruction of the physical object.

10. The system of claim 8, wherein the generating the multi-view reconstruction includes generating a point cloud representation of the physical object based on the multiple viewpoints.

11. The system of claim 7, wherein the individual image frames of the sequence of image frames are depth images that define individual depth values for individual pixels of a pixel array.

12. The system of claim 7, wherein the annotated image data is formatted in accordance with a predefined training data format corresponding to one or more artificial neural network models.

13. The system of claim 7, wherein the object annotations that represent the orientation or the location of the physical object include at least one of:
  individual object poses of the physical object within the individual images;
  object masks within the individual images; or
  individual 3D bounding boxes corresponding to the physical object within the individual images.

14. A computer-readable storage media having instructions stored thereupon which, when executed by a processor, cause a computing device to:
  receive image input data that includes image frames showing a physical object within a real-world environment;
  access model input data that defines a three-dimensional (3D) model of the physical object, the model input data being separate from the image input data;
  generate a multi-view reconstruction of the physical object based on the image input data;

receive a first pose trajectory that corresponds to generation of the image frames;

receive a second pose trajectory that corresponds to generation of the multi-view reconstruction;

determine a scale corresponding to the multi-view reconstruction based on the first pose trajectory and the second pose trajectory;

generate, in association with individual ones of the image frames and based on the scale corresponding to the multi-view reconstruction, alignment data that defines individual alignments of the multi-view reconstruction to the 3D model; and generate, based on the alignment data, annotated image data by updating the individual image frames to include object annotations that represent at least one of:
- a location of the physical object within the real-world environment, or
- an orientation of the physical object within the real-world environment.

15. The computer-readable storage media of claim 14, wherein the generating the multi-view reconstruction includes generating a point cloud representation of the physical object based on multiple viewpoints.

16. The computer-readable storage media of claim 15, wherein determining the scale corresponding to the multi-view reconstruction comprises aligning the first pose trajectory to the second pose trajectory.

17. The computer-readable storage media of claim 14, wherein the annotated image data is formatted in accordance with a predefined training data format corresponding to one or more artificial neural network models.

18. The computer-readable storage media of claim 14, wherein the object annotations that represent the orientation or the location of the physical object within the real-world environment include at least one of:
- individual object poses of the physical object within the individual images;
- object masks within the individual images; or
- individual 3D bounding boxes corresponding to the physical object within the individual images.

19. The computer-readable storage media of claim 14, wherein the plurality of image frames are a plurality of depth images that define individual depth values for individual pixels of a pixel array.

20. The computer-readable storage media of claim 14, wherein determining the scale corresponding to the multi-view reconstruction comprises aligning the first pose trajectory to the second pose trajectory.

* * * * *